United States Patent [19]

Occleshaw et al.

[11] 3,969,567

[45] July 13, 1976

[54] IMPROVEMENTS IN AND RELATING TO BOARD PRODUCTS

[75] Inventors: John E. Occleshaw, Wigan; Terence D. Smith, Stockport, both of England

[73] Assignee: TAC Construction Materials Ltd., Manchester, England

[22] Filed: Mar. 8, 1974

[21] Appl. No.: 449,434

[30] Foreign Application Priority Data

Mar. 13, 1973 United Kingdom............... 11953/73

[52] U.S. Cl.................................... 428/297; 106/98; 106/99; 252/8.1; 428/331; 428/372; 428/921; 428/539

[51] Int. Cl.²..................... C04B 29/02; C04B 7/02; B22B 13/02

[58] Field of Search............. 161/46, 151, 156, 158, 161/170, 406, 403; 162/145, 146, 154, 156, 181 C, 205, 206, 157 R; 252/8.1; 106/98, 99, 50, 90, 93, 119, 120; 428/921, 297, 331, 372, 538, 539

[56] References Cited

UNITED STATES PATENTS

| | | | |
|---|---|---|---|
| 2,332,703 | 10/1943 | Elmendorf | 161/151 X |
| 3,004,878 | 10/1961 | Tomlinson | 161/151 X |
| 3,095,346 | 6/1963 | Sfiscko | 162/181 C X |
| 3,095,347 | 6/1963 | Becker | 162/181 C X |
| 3,248,257 | 4/1966 | Cadotte et al. | 428/921 X |
| 3,352,746 | 11/1967 | Williams et al. | 162/181 C X |
| 3,367,828 | 2/1968 | Carter et al. | 162/206 X |
| 3,376,189 | 4/1968 | Myström | 162/206 X |
| 3,753,749 | 8/1973 | Nutt | 106/99 X |
| 3,767,433 | 10/1973 | Haldas et al. | 106/98 X |
| 3,783,092 | 1/1974 | Majumdar | 161/170 |
| 3,804,706 | 4/1974 | Kurashige et al. | 162/145 X |
| 3,830,687 | 8/1974 | Re et al. | 161/151 X |
| 3,847,633 | 11/1974 | Race | 106/98 |

FOREIGN PATENTS OR APPLICATIONS 539,853 7/1955 Belgium

*Primary Examiner*—Harold Ansher
*Attorney, Agent, or Firm*—Cushman, Darby & Cushman

[57] ABSTRACT

A fire-resistant board product is comprised of a hydraulic cement binder reinforced by a mixture of long and short staple vitreous fibres, silica in an amount at least sufficient to react with the free lime in the cement, together with from 1 to 10% by weight of a cellulosic fibre. Optionally, the board product further includes at least one low density filler which may provide at least part of the silica component.

15 Claims, No Drawings

IMPROVEMENTS IN AND RELATING TO BOARD PRODUCTS

The present invention relates to highly fire-resistant board products primarily intended for marine use.

Hitherto, such boards, which are normally used as cabin bulkheads and the like, have generally been made from asbestos fibre-reinforced lime-cement compositions, usually including inert fillers in order to achieve a suitable density in the board. Typically these boards range in thickness from about 1 cm. to 3 cm.

The installation of the boards, for example as cabin bulkheads, requires that they be cut to size to fit the supporting structure, which normally consists of steel frame members adapted to receive the board. This step of cutting the boards almost inevitably gives rise to dust and precautions are necessary in order to minimise the health risk to workers.

According to our invention, a fire-resistant board product is comprised of a hydraulic cement binder reinforced by a mixture of long and short staple vitreous fibres, as hereinafter defined, silica in an amount at least sufficient to react with the free lime in the cement, together with not more than 10% by weight of a cellulosic fibre. Cellulosic fibre in the context of this specification means fibre derived from wood and/or other vegetable matter. Optionally, up to 75% of the cellulosic fibre content may be replaced by another organic fibre provided that the total organic fibre content does not exceed 10% by weight. The other organic fibre may be a polyamide, polyester or polypropylene fibre or even a mixture of such fibres. Vitreous fibre, for the purpose of this specification, means glass fibres, and/or fibres produced from molten rock or slag. In particular we prefer to use fibre produced from molten rock.

"Short staple" vitreous fibre means in this present context, fibre having an average staple length of up to 1.0 cm; "long staple" viteous fibre in the same context means fibre of average staple length at least about 2 cm.

Preferably, the vitreous fibre is "alkali-resistant", either by virtue of its chemical composition or by virtue of a protective dressing applied to it during or shortly after manufacture, so that exposure to the cement binder does not unduly weaken the fibre.

We have found that although the inclusion of short staple vitreous fibre has practically no effect on the strength of the finished board, it does very considerably reduce the formation of cracks when the boards are autoclaved to develop their maximum strength. Advantageously, the short staple vitreous fibre is a mineral fibre product which has been processed, for example by milling, to give the desired staple length. The short staple vitreous fibre content should not exceed about 25% by weight.

The inclusion of the long staple vitreous fibres has been found to greatly improve the impact strength of the board, even at concentrations of the order of 2–5%, by weight.

In order to meet typical non-combustibility requirements, we prefer that the cellulosic fibre content should be in the range of from 1 to 5% by weight of the furnish used to make the board. However, even 5% of a cellulosic fibre has been found to be very beneficial in improving the bending strength of the finished board and, in terms of volume, the cellulosic fibre is the major constituent of the reinforcement in a typical board where the total vitreous fibre content is less than 25% by weight. Naturally, for other applications where the specification requirements are not as rigorous, the cellulosic content may be higher than 5%. As before up to 75% of the cellulosic fibre content may be replaced by another organic fibre, provided that the total organic fibre content does not exceed 10% by weight.

Preferably, boards according to the invention further include an inert low-density filler in order to bring the density of the board into the range specified for the particular application. The proportion of inert filler required can be reduced somewhat by using as the silica component a low-density material such as diatomite. Suitable inert fillers include perlite which may form up to 20% by weight of the board furnish.

The invention further comprises a method of making a fire-resistant board, the method including the steps of mixing short staple vitreous fibre (as hereinbefore defined), long staple vitreous fibre (as hereinbefore defined), hydraulic cement, silica, inert filler, cellulosic fibre and water, in a beater to form a slurry, followed by sheeting off the slurry to form a wet board which is then consolidated prior to maturing, autoclaving and stoving. The method may also include the step of pretreating vitreous fibre, for example by milling, in order to produce the short staple fibre.

Preferably, the cellulosic fibre is subjected to an opening treatment in water, for example in a hydrapulper, refiner or in a beater, prior to mixing with the other ingredients. Most conveniently the opening treatment is carried out in the same beater as is eventually used for making the slurry, but even where the opening is carried out in another apparatus, we prefer to add the opened cellulosic fibre to the beater before the other ingredients. This minimises the tendency for the powdered ingredients in particular to settle out on the bottom of the beater.

The beater may be an ordinary hollander beater as traditionally used in the paper industry and it is important to note that up to the present it has generally been thought impossible to satisfactorily process vitreous fibres in this type of equipment. Preferably, the cement, silica and inert filler are pre-mixed together with water, before introducing them to the beater, the latter already containing the cellulosic fibre and water. It has been found that the vitreous fibre mixture can then be very satisfactorily added to the beater in the presence of the relatively high-volume cellulosic fibre component, which appears in some way to very greatly assist the thorough dispersion of the vitreous fibres throughout the slurry.

The invention includes fire-resistant boards made by the process and/or from compositions according to the invention.

In order that the invention be better understood, fire-resistant boards according to the invention, together with their manufacture by the method just mentioned, will now be described by way of example. In the following description of the board furnish, all proportions are based on the dry weight of the components.

EXAMPLE 1

| Furnishing: | | |
|---|---|---|
| | Long Staple Vitreous Fibre | 2% |
| | Short Staple Vitreous Fibre | 10.2% |
| | Bleached Kaukus Pulp | 5% |
| | Ordinary Portland Cement | 36.2% |
| | Diatomite | 39.1% |

-continued

| | |
|---|---|
| Perlite | 7.5% |

The short staple vitreous fibre was prepared by pretreating an alkali-resistant mineral fibre in a mill in order to reduce the average staple length to less than 0.5 cm. The long staple vitreous fibre was a proprietary alkali-resistant glass fibre product of staple length about 2.5 cm. made by chopping continuous strands to the desired length.

The furnish ingredients were mixed by firstly premixing the cement, diatomite and perlite with water and then adding the resultant mixture to water in a hollander beater. The pulp was then added to the beater (although it could equally well have been added before the powder ingredients), followed by the vitreous fibre. The slurry in the beater was adjusted to a water-solids ratio of about 3.4:1 and then formed into a sheet on a board machine of the kind having an endless felt and equipped with vacuum suction boxes to dewater the sheet, which was roller-consolidated before cutting into "green" boards. The green boards were then air-matured for 3 days, autoclaved for 26 hours and then stoved for 12 hours.

The resultant board had a modulus of rupture of about 4700 KN/m² at a density of 640 Kg/m³; its thickness was 2 cm.

The board was finished by sanding and applying a decorative laminate to the faces.

EXAMPLE 2

| Furnish: | Long Staple Vitreous Fibre | 2% |
|---|---|---|
| | Short Staple Vitreous Fibre | 10.2% |
| | Bleached Kaukus Pulp | 4% |
| | 20 denier Polyamide Fibre, 2.5 cm. Staple Length | 1% |
| | Ordinary Portland Cement | 36.2% |
| | Diatomite | 39.1% |
| | Perlite | 7.5% |

This furnish was slurried and boards were made from the slurry using the procedures just described in Example 1. When tested, the boards were similar in properties to those of Example 1 but had a rather better modulus of rigidity.

Testing was carried out according to the criteria set out in the Merchant Shipping (Passenger Ship Construction) Rules, 1965, which lay down standards as to the rate of passage of flame, non-combustibility and properties such as modulus of rupture, density and screw-holding ability. The performance of both sets of boards was satisfactory and comparable to that achieved by prior art boards including asbestos fibre.

We claim:

1. An autoclaved fire-resistant board product consisting essentially of, in combination, a hydraulic cement binder, water, a mixture of long and short staple vitreous fibres, from 1 to 10% by weight of a cellulosic fibre, together with chemically reactive silica in an amount sufficient to react with the free lime remaining in the product after reaction between the cement and the water.

2. A fire-resistant board product according to claim 1, wherein up to 75% of the cellulosic fibre content is replaced by an organic synthetic fibre.

3. A fire-resistant board product according to claim 1, wherein the cellulosic fibre content is in the range from 1 to 5% by weight.

4. A fire-resistant board product according to claim 1, wherein at least some of the vitreous fibre is derived from molten rock or slag.

5. A fire-resistant board product according to claim 1, wherein the vitreous fibre is glass fibre.

6. A fire-resistant board product according to claim 1, wherein the vitreous fibre is alkali resistant.

7. A fire-resistant board product according to claim 1, including up to 25% by weight of short staple vitreous fibre.

8. A fire-resistant board product according to claim 1, including an inert low density filler.

9. A fire-resistant board product according to claim 8, wherein at least part of the silica component is provided by a low density filler.

10. A fire-resistant board product according to claim 8 including perlite as low density filler.

11. A fire-resistant board product according to claim 9 wherein the silica-containing low density filler is diatomite.

12. A method of making a fire-resistant board product comprising the steps of mixing short staple vitreous fibre, long staple vitreous fibre, hydraulic cement, silica, cellulosic fibre and water in a beater to form a slurry, sheet off the slurry to form a wet board which is then consolidated, allowed to stand at ambient temperature, autoclaved, and stoved.

13. A method according to claim 12 including the step of milling vitreous fibre to produce the short staple length.

14. A method according to claim 12 including the preliminary step of opening the cellulosic fibre in water.

15. A fire-resistant board product according to claim 1, wherein the silica content is at least about 25% weight.

* * * * *